(12) United States Patent
Finman et al.

(10) Patent No.: US 11,865,440 B2
(45) Date of Patent: Jan. 9, 2024

(54) AUGMENTED REALITY HAT

(71) Applicant: Niantic, Inc., San Francisco, CA (US)

(72) Inventors: Ross Edward Finman, Bellevue, WA (US); Michael Miller, London (GB); Maryam Sabour, Toronto (CA)

(73) Assignee: NIANTIC, INC., San Francisco, CA (US)

( * ) Notice: Subject to any disclaimer, the term of this patent is extended or adjusted under 35 U.S.C. 154(b) by 6 days.

(21) Appl. No.: 17/721,756

(22) Filed: Apr. 15, 2022

(65) Prior Publication Data

US 2022/0331689 A1 Oct. 20, 2022

Related U.S. Application Data

(60) Provisional application No. 63/231,042, filed on Aug. 9, 2021, provisional application No. 63/175,502, filed on Apr. 15, 2021.

(51) Int. Cl.
*A63F 13/26* (2014.01)
*A63F 13/212* (2014.01)
*A63F 13/213* (2014.01)

(52) U.S. Cl.
CPC ............ *A63F 13/26* (2014.09); *A63F 13/212* (2014.09); *A63F 13/213* (2014.09); *A63F 2300/8082* (2013.01)

(58) Field of Classification Search
CPC ...... A63F 13/26; A63F 13/212; A63F 13/213; A63F 2300/8082; A63F 13/65; A63F 13/02
See application file for complete search history.

(56) References Cited

U.S. PATENT DOCUMENTS

| 4,023,212 A | 5/1977 | Huffman |
| 8,757,831 B2 * | 6/2014 | Waters ................... A42B 1/244 200/566 |

(Continued)

FOREIGN PATENT DOCUMENTS

KR   10-2027959 B1   11/2019

OTHER PUBLICATIONS

Claburn, T., "Facebook granted patent for 'artificial reality' baseball cap. Repeat, an 'artificial reality' baseball cap," Jun. 23, 2021, 11 pages, [Online] [Retrieved on Mar. 2, 2023] Retrieved from the Internet <URL: https://www.theregister.com/2021/06/23/facebook_ar_hat/>.

(Continued)

*Primary Examiner* — Seng H Lim
(74) *Attorney, Agent, or Firm* — FENWICK & WEST LLP

(57) ABSTRACT

A wearable augmented reality device is described. The device comprises a headband, brim, optical displays, and environmental sensors. The headband wraps at least partially around a head of a user and distributes the weight of components of the device across the head of the user, supporting the device. The brim is coupled to the headband such that the brim extends away from the headband, over the eyes of the user. The brim includes a heatsink that releases heat from the electronics of the device into the environment. The optical displays are coupled to the underside of the brim. The optical displays both present image light and allow environmental light to pass through. The environmental sensors are couples to the forward edge of the brim and capture data about the environment.

19 Claims, 11 Drawing Sheets

(56) References Cited

U.S. PATENT DOCUMENTS

| | | | | |
|---|---|---|---|---|
| 10,488,663 | B2* | 11/2019 | Choi | G06F 1/163 |
| 10,722,403 | B2* | 7/2020 | Saladino | A61F 9/029 |
| 10,869,517 | B1* | 12/2020 | Halpern | A42B 1/208 |
| 11,039,651 | B1* | 6/2021 | Bosworth | H04S 7/303 |
| 11,196,851 | B2* | 12/2021 | Garcia-Sanchez | H04B 1/3877 |
| 2010/0313335 | A1* | 12/2010 | Waters | H04N 13/207 |
| | | | | 2/209.13 |
| 2012/0050144 | A1* | 3/2012 | Morlock | G06T 19/006 |
| | | | | 345/8 |
| 2013/0125291 | A1 | 5/2013 | Davison et al. | |
| 2013/0192961 | A1* | 8/2013 | Waters | H01H 13/02 |
| | | | | 220/379 |
| 2013/0201299 | A1* | 8/2013 | Waters | A42B 1/245 |
| | | | | 348/376 |
| 2014/0304891 | A1* | 10/2014 | Waters | A42B 1/24 |
| | | | | 2/209.13 |
| 2017/0006949 | A1* | 1/2017 | Lacy | A42B 1/22 |
| 2017/0139212 | A1* | 5/2017 | Choi | G06F 1/163 |
| 2017/0367651 | A1* | 12/2017 | Tzvieli | A61B 5/0075 |
| 2018/0017796 | A1* | 1/2018 | Toso | G02B 27/0172 |
| 2018/0050268 | A1* | 2/2018 | Jones | G06F 3/016 |
| 2018/0217798 | A1 | 8/2018 | Urbach et al. | |
| 2018/0255285 | A1* | 9/2018 | Hall | H04N 13/344 |
| 2019/0227328 | A1 | 7/2019 | Coatney | |
| 2019/0258061 | A1* | 8/2019 | Solomon | G02B 27/0172 |
| 2020/0152039 | A1* | 5/2020 | Kasahara | G06K 7/1443 |
| 2020/0209509 | A1* | 7/2020 | Chen | G02B 7/002 |
| 2020/0383240 | A1* | 12/2020 | Rohena | G06F 1/206 |
| 2021/0059344 | A1 | 3/2021 | Ralston et al. | |
| 2021/0325680 | A1* | 10/2021 | Maric | G02C 5/02 |
| 2022/0273062 | A1* | 9/2022 | Porter | G02B 27/0176 |

OTHER PUBLICATIONS

PCT International Search Report and Written Opinion, PCT Application No. PCT/IB2022/053573, dated Jul. 25, 2022, ten pages.

* cited by examiner

AUGMENTED REALITY HAT

CROSS-REFERENCE TO RELATED APPLICATIONS

This application claims priority to U.S. Provisional Application No. 63/175,502, filed Apr. 15, 2021 and U.S. Provisional Application No. 63/231,042 filed Aug. 9, 2021. Both of the foregoing are incorporated herein by reference in their entireties.

TECHNICAL FIELD

The present disclosure relates generally to augmented reality (AR), and, in particular, to wearable AR devices.

BACKGROUND

Various AR devices for consumer use-cases have been developed in the last ten to fifteen years. Widespread adoption of wearable AR devices has been hindered by challenges in providing a balance of usefulness and socially acceptable form factor that is acceptable to the market. Technological limitations have been a barrier for achieving a desirable level of functionality in conjunction with a form factor that is acceptable to a broad range of users. When trying to fit the components of a useful system in a glasses or headset form factor, the wearable device becomes heavy and large, which can be both inconvenient, uncomfortable, and not socially acceptable for many users. In contrast, smaller form factor devices that are more convenient and may be considered more socially acceptable have less functionality and the applicative value becomes too low.

SUMMARY

The above and other challenges may be addressed by a wearable AR device that has integrated electronic components for providing AR content to the wearer. Various features, aspects, and advantages of the wearable AR device may be better understood with reference to the following description and appended claims. The accompanying drawings illustrate specific embodiments and, together with the description, serve to explain various principles. However, the drawings should not be considered limiting. Rather, the scope of protection should be determined from the claims. The following description focuses on a particular use-case—a baseball cap with AR functionality for outdoor gaming—but the disclosed principles may be applied to other use cases and form factors. Inherent properties of the cap form factor, such as the brim and the large area of the crown, may be used for various aspects of an AR system.

In various embodiments, a wearable AR device includes a headband, adjustment region, brim, one or more optical displays, one or more sensors, and one or more speakers. The device has a form factor of a baseball cap or visor depending on whether a crown portion is attached to the headband. The headband wraps at least partially around the head of the user and acts to support the device and distribute weight of the components of the device across the head of the user for comfort. The adjustment region is positioned at a portion of the headband that is intended to be at the back of the user's head when worn. The adjustment region may store a battery of the device and enable adjustment of the size (e.g., the length or diameter) of the headband to fit the head of the user. The brim is coupled to the headband such that it is positioned in the front of the user's head and extends in front of the user at approximately brow level when worn as intended.

In one embodiment, the brim includes a heatsink that releases heat from components of the device into the environment to prevent overheating or discomfort to the user. Attached to the underside of the brim are one or more optical displays that present image light and allow environmental light to pass through such that both image light and environmental light are received by the eyes of the user. One or more speakers are attached to the headband and provide audio to the user. In some embodiments the speakers may be attached at regions of the headband that are closest to the ears of the user.

DETAILED DESCRIPTION

Figure 1:
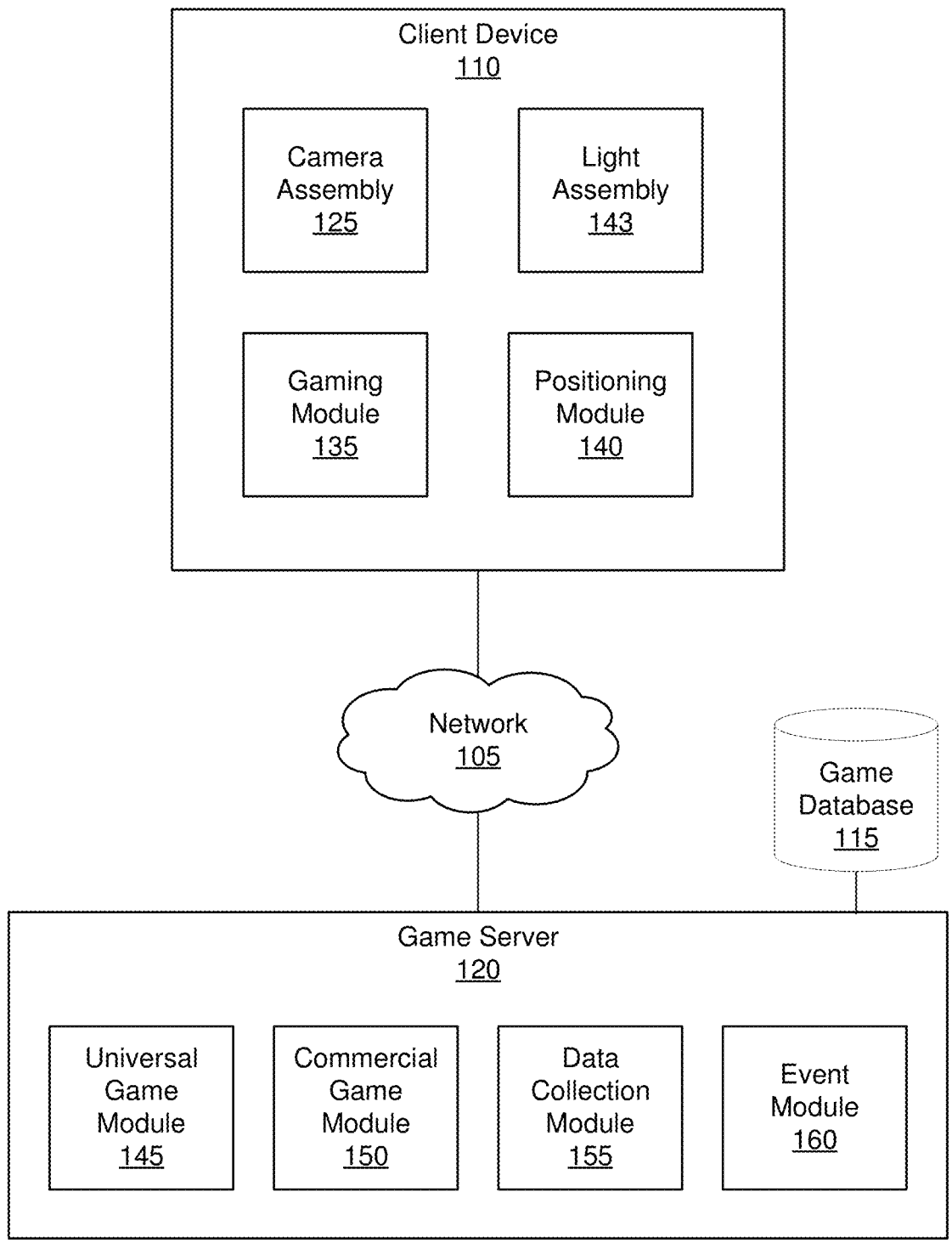
FIG. 1 is a block diagram of a networked computing environment suitable for providing a parallel-reality game with augmented reality elements, according to one embodiment.

Reference now will be made in detail to various embodiments, one or more examples of which are illustrated in the drawings. Each example is provided by way of explanation of the described embodiments, not limitation of the claims. In fact, it will be apparent to those skilled in the art that various modifications and variations can be made without departing from the principles described. For instance, features illustrated or described as part of one embodiment can be used with another embodiment to yield a still further embodiment. Thus, it is intended that the present disclosure covers such modifications and variations as come within the scope of the appended claims and their equivalents.

Exemplary Location-Based Parallel Reality Gaming System

In a parallel reality game, a virtual world geography that parallels at least a portion of the real-world geography such that player movement and actions in the real-world affect actions in the virtual world and vice versa. The virtual world may include augmented reality (AR) content that players can view overlaid on images of the real world by traveling to the corresponding real-world locations. Those of ordinary skill in the art, using the disclosures provided herein, will understand that the subject matter described is applicable in other situations where AR images are displayed. Furthermore, those of ordinary skill in the art, using the disclosures provided herein, will appreciate that numerous game interface configurations and underlying functionalities will be apparent in light of this disclosure. The present disclosure is not intended to be limited to any one particular configuration.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, a player who is close enough to a virtual element to interact with it in this manner is referred to as being at the real-world location corresponding the virtual element. In addition, various embodiments are described with reference to "the player's location" but one of skill in the art will appreciate that such references may refer to the location of the player's client device 110.

Figure 2:
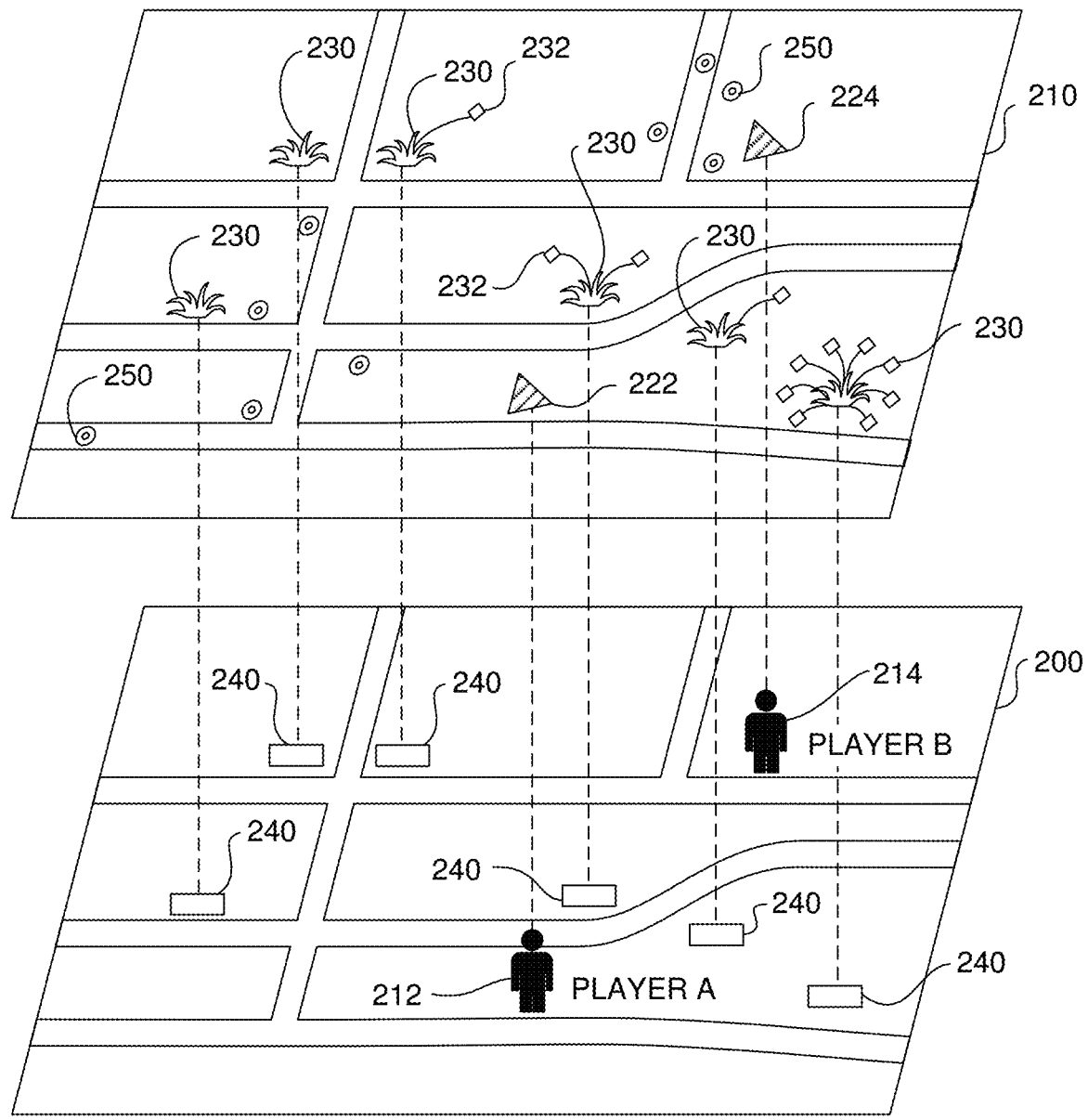
FIG. 2 illustrates correspondence in coordinates between a virtual world and the real world in a parallel reality game, according to one embodiment.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. Some or all of the virtual objects can be an AR object that is displayed by the client device 110. AR objects can include animate and inanimate objects. Animate objects may be referred to as a virtual character. Virtual characters can represent a character of the game, such as a non-player character (NPC). A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player travels to the landmark or geographic location 240 linked to the virtual elements 230 in the real world and interacts with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as viewing an AR representation of the virtual element overlaid over a view of the real world location in a set of images (e.g., a video) captured by a camera and taking a "photograph" of the virtual element within the real world. The set of images and the photograph may be captured by a camera mounted on a wearable AR device (e.g., an AR hat).

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy or other items as part of the parallel reality game. As depicted in FIG. 2, virtual energy 250 can be scattered at different locations in the virtual world 210. A player can collect the virtual energy 250 and other items by traveling to the corresponding locations in the real world 200. The virtual energy 250 can be used to power virtual items or to perform various game objectives in the game. Other items may perform any other suitable function, depending on the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device.

In one embodiment, the functionality described below as performed by the client device 110 is distributed between a mobile computing device such as a tablet or smartphone and a wearable device such as an AR hat. For example, one or more cameras on an AR hat worn by a player may capture images of the environment around the player, the player's smartphone may determine the real-world location at which to display one or more AR elements, and one or more displays mounted on the AR hat may display the AR elements at the determined locations. In another embodiment, the AR hat provides all of the functionality described below as performed by the client device 110.

In one embodiment, the client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, the client device 110 includes additional software components such as a gaming module 135 and a positioning module 140, and a light assembly 143. The client device 110 may include various other input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data.

In one instance, the camera assembly 125 includes a pair of cameras mounted on the left and right sides of an AR hat that are configured to capture stereo image data from positions that approximate the positions of the wearer's eyes. In another instance, the camera assembly 125 includes a single camera mounted in an approximate center of the front side of the AR hat. In various other implementations, the camera assembly 125 includes multiple cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device, such as optical displays mounted on a brim of an AR hat and positioned in front of the wearer's eyes. The user interface may include virtual elements associated with the game and enable a player to interact with the virtual elements to perform various game objectives. The gaming module 135 may generate virtual content or adjust virtual content according to other information received from other components of the client device. For example, the gaming module 135 may adjust a virtual object to be displayed on the user interface according to a depth information of the scene captured in the image data.

The gaming module 135 can also control various other outputs to allow a player to interact with the game. For instance, the gaming module 135 can control various audio, vibratory, or other notifications. The gaming module 135 can access game data received from the game server 120 to provide an accurate representation of the game to the player. The gaming module 135 can receive and process player input and provide updates to the game server 120 over the network 105. The gaming module 135 may also generate or adjust game content to be displayed by the client device 110. For example, the gaming module 135 may generate a virtual element based on information describing traversable space of a scene (e.g., as determined by the traversable space estimation model 130). For example, the gaming module 135 may determine a path for a virtual element in the scene on the traversable space.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location. For example, the client device 110 may perform localization by comparing images captured by one or more cameras of the client device to a 3D map.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The light assembly 143 includes one or more lights that may illuminate the environment around the client device. In one embodiment, the light assembly 143 includes a flash associated with the camera assembly 125. The flash may briefly light up to aid in the capturing of a single photograph or may light for an extended period of time to act as a flashlight. In other embodiments, the light assembly 143 may include different types of light, such as an infrared light to illuminate objects and enable images to be captured of a scene by an infrared camera without illuminating the scene with visible light.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a traversable space estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users (e.g., players), or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Augmented Reality System

In various embodiments, augmented reality content can be provided by an augmented reality engine on a client device 110. For example, the augmented reality engine may execute on a smartphone, tablet, or wearable device (e.g., an AR hat), or be distributed between a combination of such elements. The augmented reality engine may receive a stream of digital images produced by the camera assembly 125 of the client device 110. The digital images represent a near real-time view of the environment around the client device 110.

The augmented reality engine may also receive a geolocation position from a geolocation positioning system (e.g., positioning module 140). The augmented reality engine may use the geolocation position to identify and obtain (e.g., by downloading it from the server 120) 3D map data (e.g., a point cloud) for the environment around the client device 110. The augmented reality engine may perform localization to determine a more precise position of the client device 110 by comparing images captured by the camera assembly 125 of the client device 110 to the 3D map data. Using the determined position of the client device 110, the augmented reality engine may identify one or more augmented reality elements that have locations in the virtual world that correspond to real-world locations in the field of view of one or more cameras of the camera assembly 125. The augmented reality engine may cause the augmented reality elements to be displayed overlaid on images captured by the camera assembly 125.

Exemplary Wearable Augmented Reality Device

As described above, some or all of the functionality of the client device 110 may be provided by a wearable device. In one embodiment, the wearable device is an AR hat. The AR hat may have a baseball cap form factor. Alternatively, the AR hat may have other form factors, such as a visor, fedora, or sombrero.

The baseball cap structure includes, the brim, the headband, and the crown. In one embodiment these parts are modified into volumetric shapes that can contain some or all of the system components for providing augmented reality content to the wearer. The crown of the cap can be hardened with a ribbed structure to support the mounting of the system components. In another embodiment, the crown is removable and made of fabric, so the brim and the headband are configured to house the system components.

Figure 3:
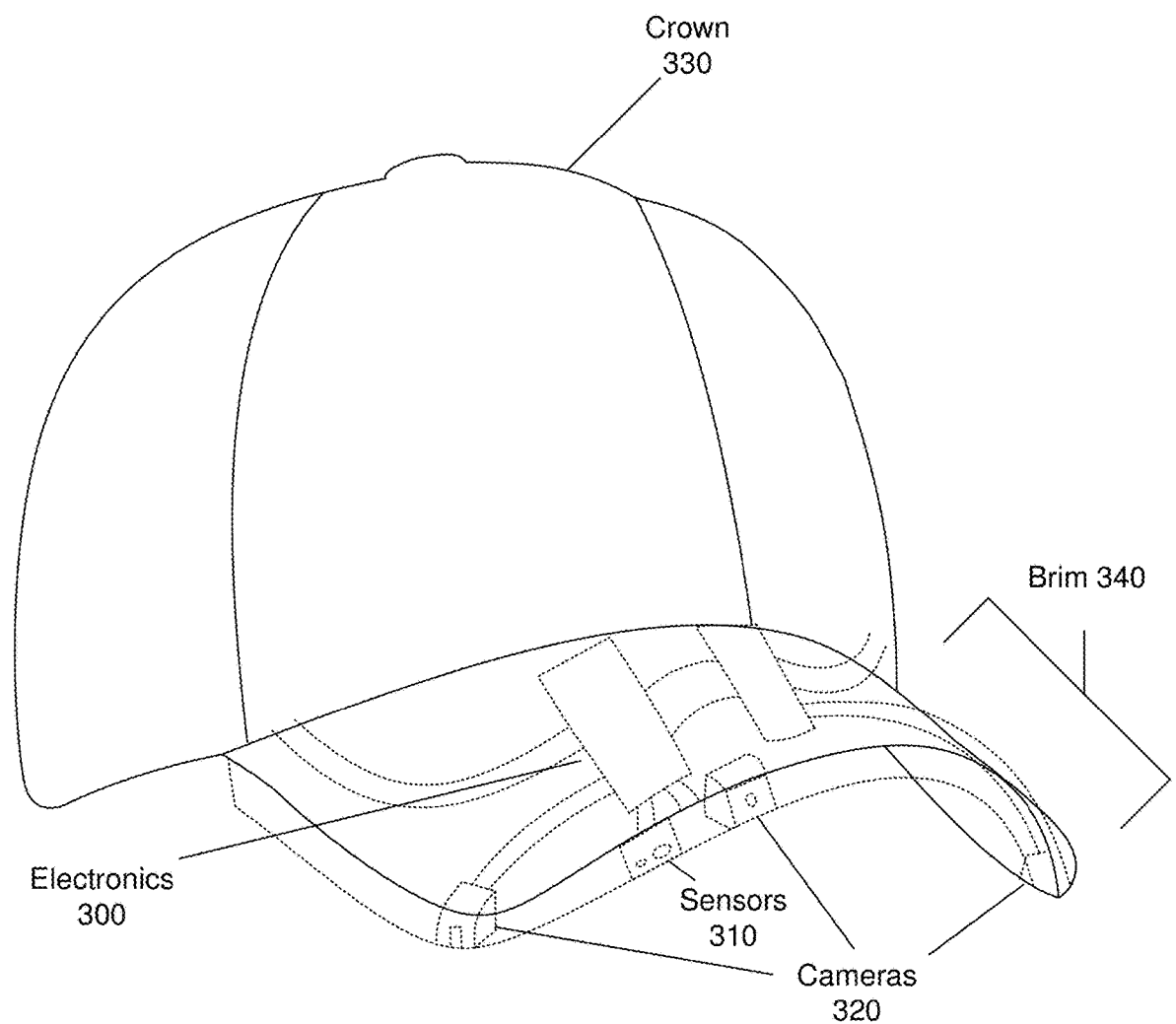
FIG. 3 is front-left perspective view of a wearable augmented reality device detailing the position of electronics, sensors, and cameras, according to one embodiment.

FIG. 3 illustrates one embodiment of an AR hat with a baseball cap form factor. In the embodiment shown, the baseball cap includes electronics 300 mounted inside the brim 340 of the hat. The electronics 300 may include environmental sensors such as the cameras 320 and sensors 310 as well as communication components (BT, Wi-Fi, cellular, 5G, etc.), computing units (CPU, GPU), memory, and wiring etc. (not shown). In some embodiments, the environmental sensors are on the forward most edge of the brim 340 and include cameras, depth sensors, and microphones. In the embodiment shown in FIG. 3 the headband is not visible as it is behind the surface of the crown 330. In some embodiments the crown 330 and headband may be a single non-separable component while, in other embodiments, the two are separate.

Figure 4A:
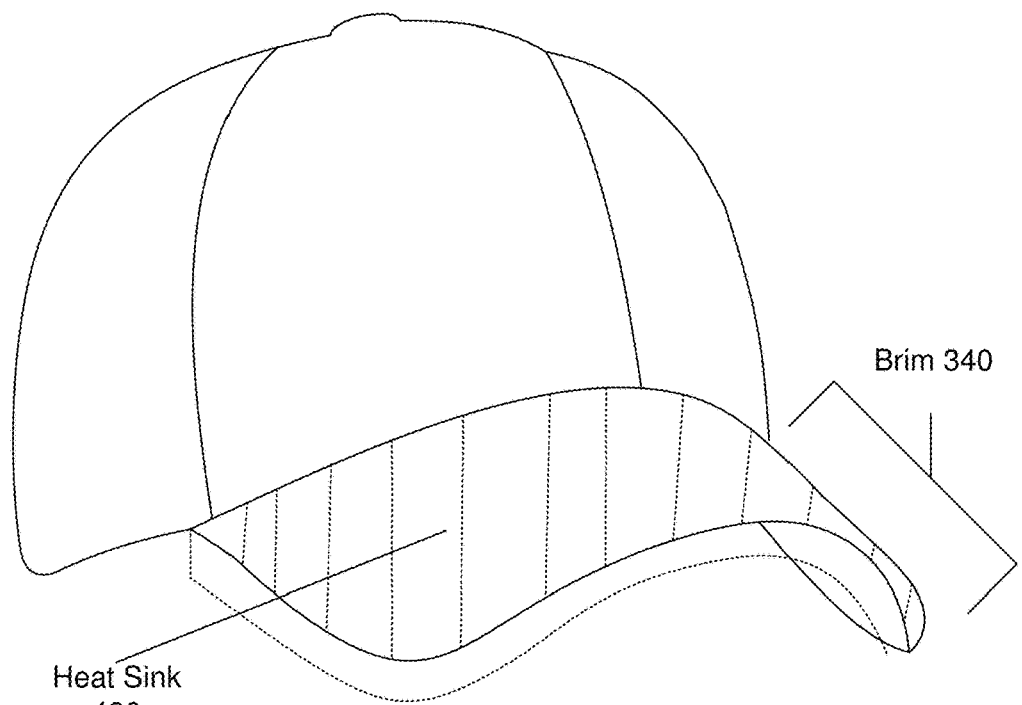
FIG. 4A is a front-left perspective view of a wearable augmented reality device showing the heat dissipation area, according to one embodiment.

FIG. 4A is a front-left perspective view of a wearable augmented reality device showing the heat dissipation area, according to one embodiment. As shown the top surface of the brim 340 may be used for heat dissipation, with a built in heatsink 400 spreading heat across the full brim and into the environment. The heatsink may be made of materials comprising copper, aluminum, an alloy, or other heat conducting material and have surface features (e.g., ridges or vanes) that increase the surface area of the heat dissipation area 400. In some embodiments the heatsink 400 is the entire brim 340 and the brim 340 is a piece of heat conducting material. In other embodiments, the heatsink 400 is a subsection of the brim 340 such as just the top or bottom surface and the rest of the brim 340 is not made of the heat conducting material of the heatsink 400

In another embodiment, the heat sink 400 is a heat conductive plate inside the materials of the brim 340. In this embodiment, to encourage dissipation of heat the brim 340 includes a fan that circulates air around the heat sink 400 and out of the brim 340. The brim 340 may additionally include vents to allow air to pass in and out of the brim 340.

Figure 4B:
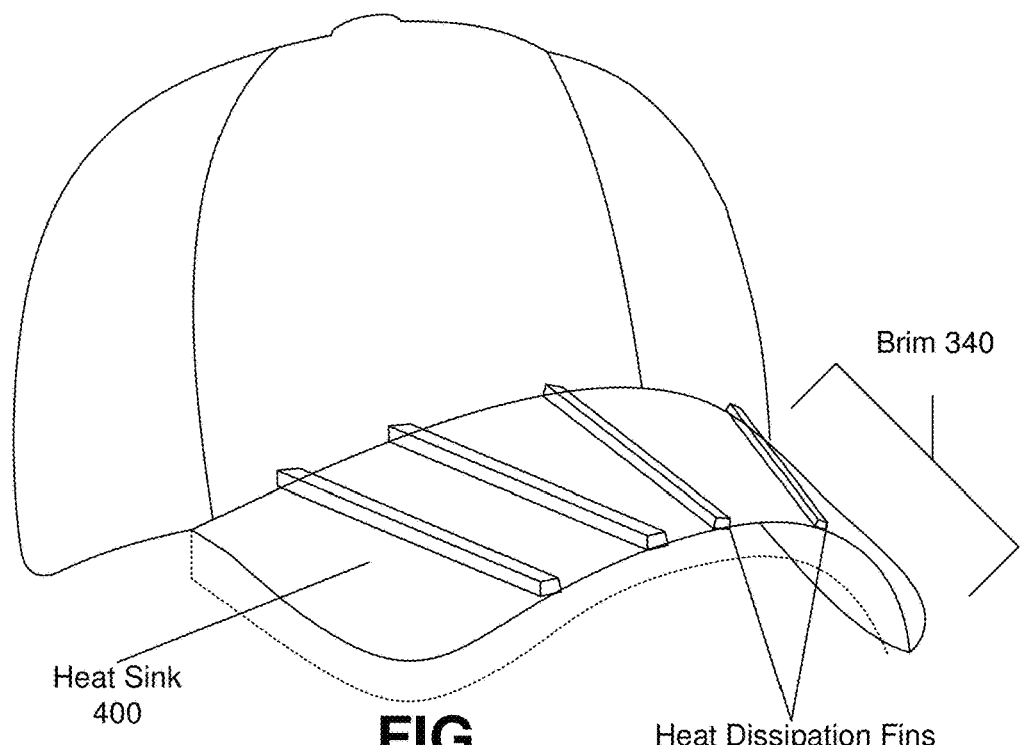
FIG. 4B is a front-left perspective view of a wearable augmented reality device showing the heat dissipation area having heat dissipation fins, according to one embodiment.

FIG. 4B is a front-left perspective view of a wearable augmented reality device showing the heat dissipation area having heat dissipation fins 410, according to one embodiment. The fins 410 are made of heat conductive materials and are shaped to add surface area to the brim 340. The increased surface area allows for more heat to be able to dissipate out of the brim 340 and away from the internal components and the head of the user. In similar embodiments the surface area of the brim 340 may be increased with etching or other textures rather than adding heat dissipation fins 410. For example, the surface of the brim 340 may be scored or dimpled to achieve the same effect.

Figure 5:
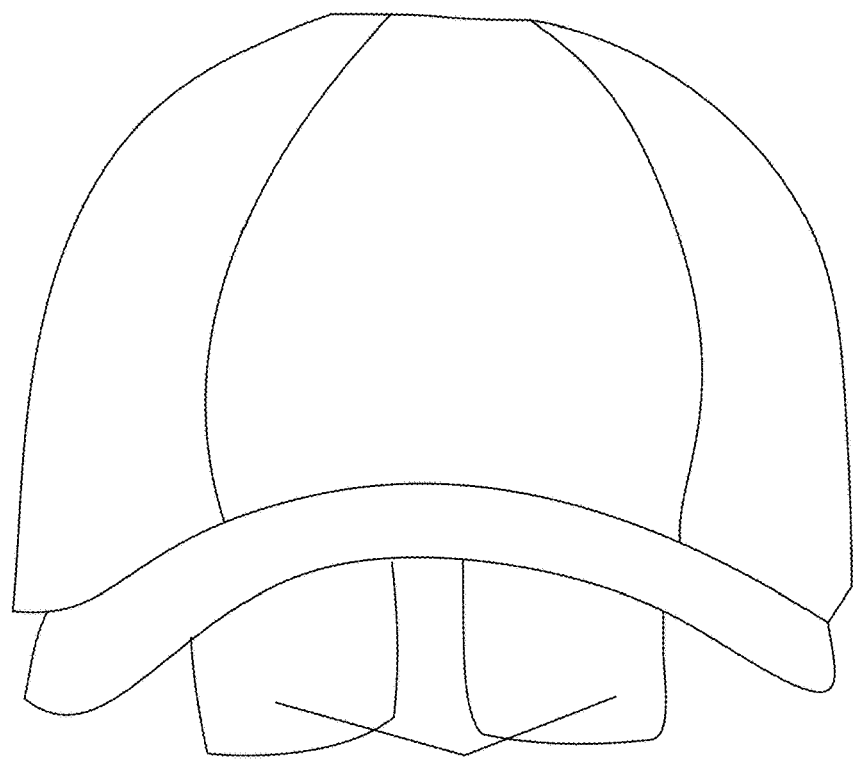
FIG. 5 is a front view of a wearable augmented reality device with the optical displays in the unfolded position, according to one embodiment.

FIG. 5 illustrates that, in one embodiment, see-through optical displays 500 are mounted on the bottom surface (e.g., underside) of the brim. The optical displays 500 are positioned to be in front of the wearer's eyes. The optical displays 500 emit image light to the eyes of the user such as visuals for an augmented reality game. The optical displays 500 are also transparent to allow light from the environment of the device to pass through the optical displays 500 such that the user can see the image light and the environment at the same time. Thus, the wearer may perceive augmented reality objects as being overlaid on the environment around them. Although FIG. 5 illustrates the hat having a pair of optical displays 500, in some embodiments, the hat may have a single optical display 500 that is large enough to be in front of both of the wearer's eyes.

Figure 6:
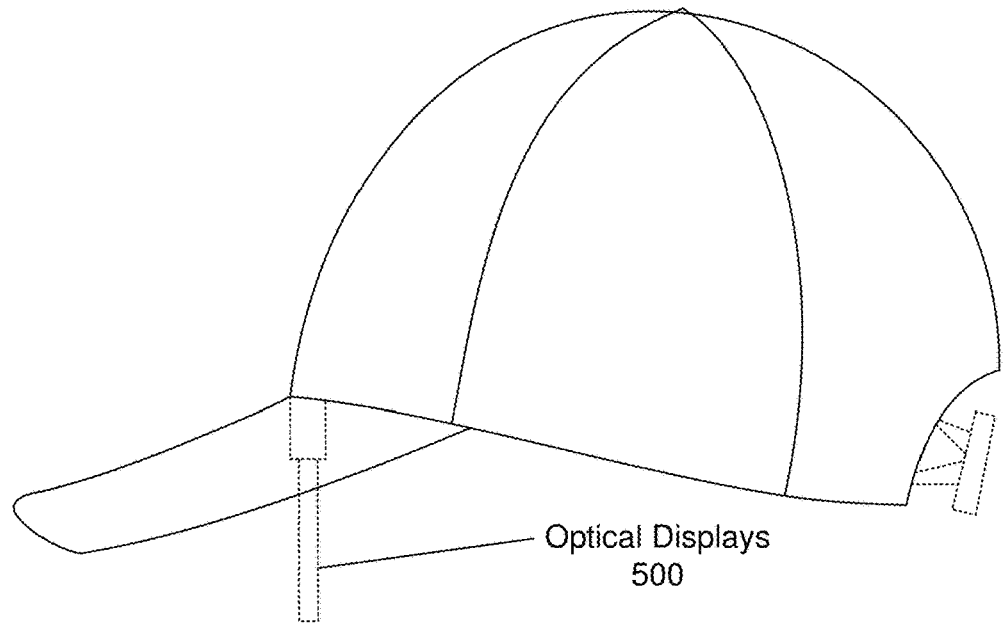
FIG. 6 is a right side view of a wearable augmented reality device with the optical displays in the unfolded position, according to one embodiment.

In some embodiments, the optical displays 500 may fold or hinge upwards into a folded position to rest against the underside of the brim (or be contained within a cavity within the brim) when not in use. FIG. 6 shows the optical displays 500 in an unfolded position. When the optical displays 500 are in the unfolded position, they are perpendicular or approximately perpendicular (e.g. within twenty degrees) to the brim's bottom surface. In some embodiments, the optical displays 500 are mounted on a hinge connected to the underside of the brim to enable adjustment of their angle relative to the wearer's eyes.

Figure 7:
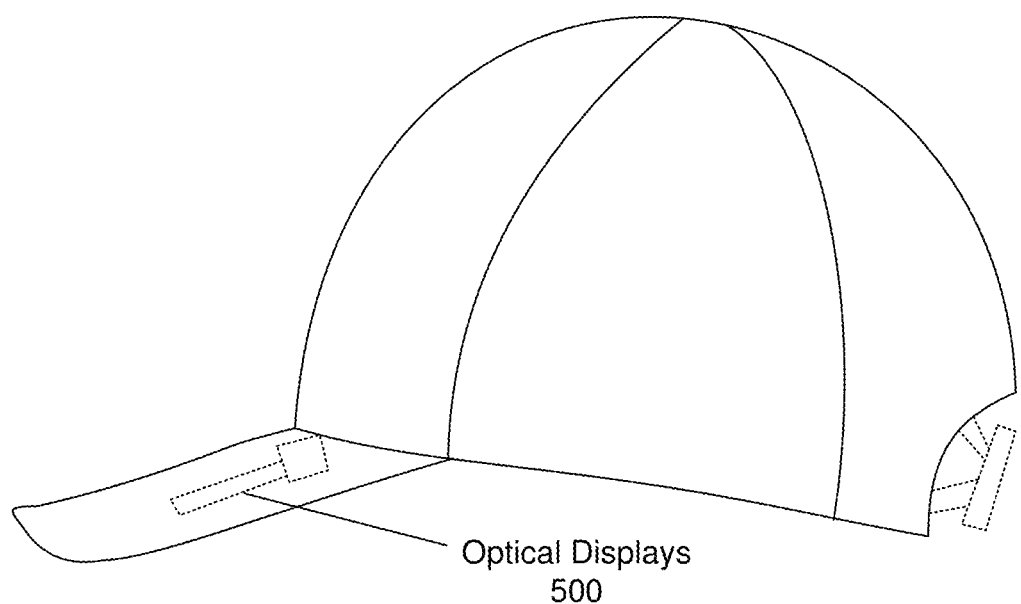
FIG. 7 is a right side view of a wearable augmented reality device with the optical displays in the folded position, according to one embodiment.

FIG. 7 illustrates the optical displays 500 may also enable the user to rotate the optical displays 500 folded up on the hinges to be parallel to the brim of the hat for storage. Thus, when the AR functionality is not being used, the wearer's view is not to obstructed by the inactive optical displays 500. Because there is space between the optical displays 500 under the brim and the wearer's eyes, the hat may be worn with vision correction glasses or sunglasses. In some embodiments, vision correction glasses or sunglasses may be incorporated into the hat by being temporarily or permanently connected to the hat using one or more connectors (e.g., on the underside of the brim or bottom edge of the crown).

Figure 8:
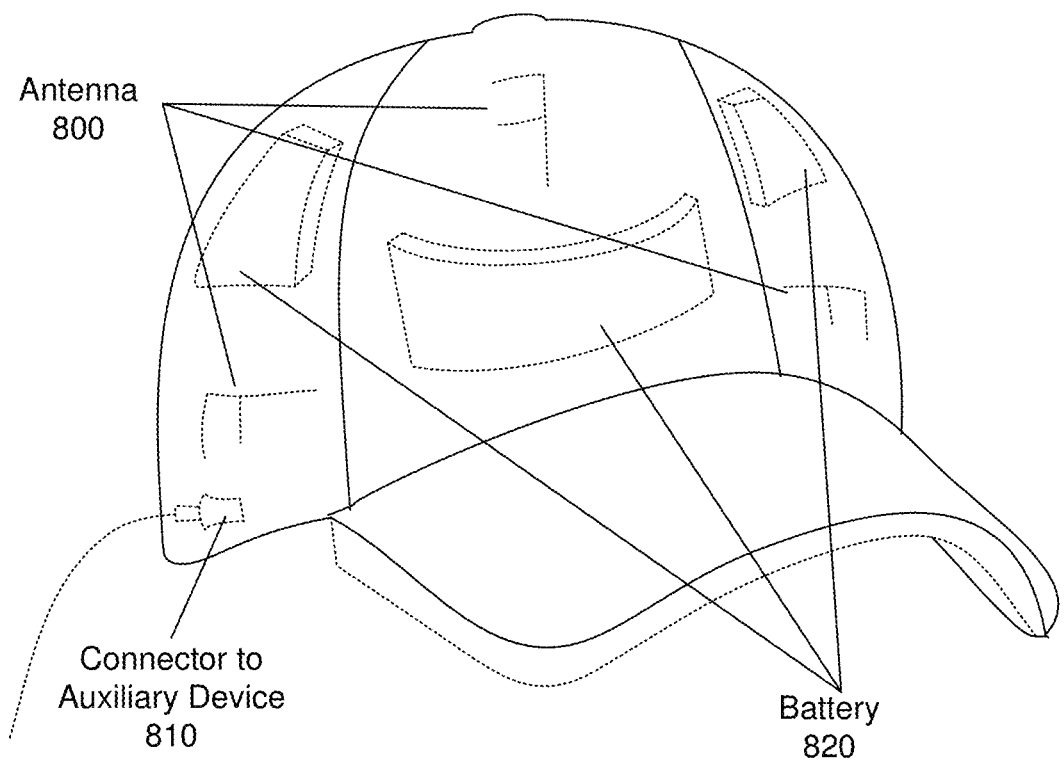
FIG. 8 is a front-left perspective view of a wearable augmented reality device detailing the position of the antennae, according to one embodiment.

FIG. 8 illustrates an embodiment in which the hat includes wireless and wired communication functionality. A set of antennas 800 are mounted around the crown of the cap. The antennas 800 allow better communication with cell tower antennas. Although three antennas 800 are shown in FIG. 8, it should be appreciated that any number of antennas may be mounted on a hat, limited only by the size of the antennas and the available space on (and inside of) the hat.

In addition, the hat includes a socket 810 for connecting the hat to a separate device. The connector to auxiliary device 810 may be a port for a cable attachment or permanently attached cable to connect a separate device to the AR hat. In one embodiment this separate device is a mobile phone running an application that controls the AR hat. For example, the wearer may connect the hat to their smartphone to enable images and sensor data captured by the hat to be passed to the smartphone for processing or for the smartphone to provide AR data for displaying AR content on the optical displays 500 of the hat. In another embodiment the separate device is an external battery pack to power the AR hat. In this embodiment the external battery may decrease the weight of the AR hat by replacing the batteries in the crown of the hat, or it may increase the battery life of the AR hat by supplying an extra power source. In any embodiment there may be one or more connectors 810 to auxiliary devices such that the AR hat can be connected to multiple devices at once.

The hat may also include one or more batteries 620 to provide power to the other components. Additionally or alternatively, power may be provided through the connector 810 from an auxiliary device. The batteries 820 may be custom in shape to fit the rounded form of the crown of the hat.

Figure 9:
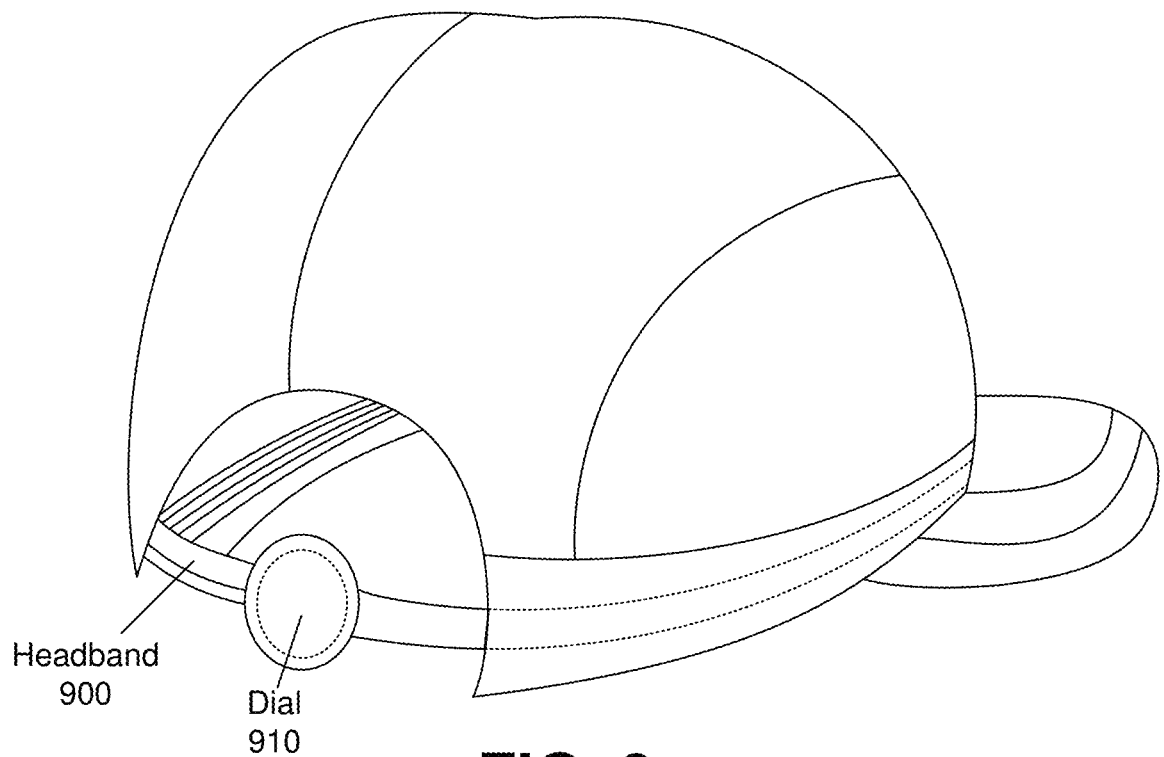
FIG. 9 is a left-rear perspective view of a wearable augmented reality device detailing the adjustable headband with dial, according to one embodiment.

FIG. 9 depicts a back-left perspective view of an embodiment of the AR hat having a baseball cap form factor. In the embodiment shown, the back of the baseball cap has a headband 900 with dial 910. To hold the system firmly on the user's head, the regular sweatband of the hat may be replaced with a wrap-around headband 900 which can be tightened and released by turning the dial 910 to accommodate the wearer's head dimensions.

Figure 10:
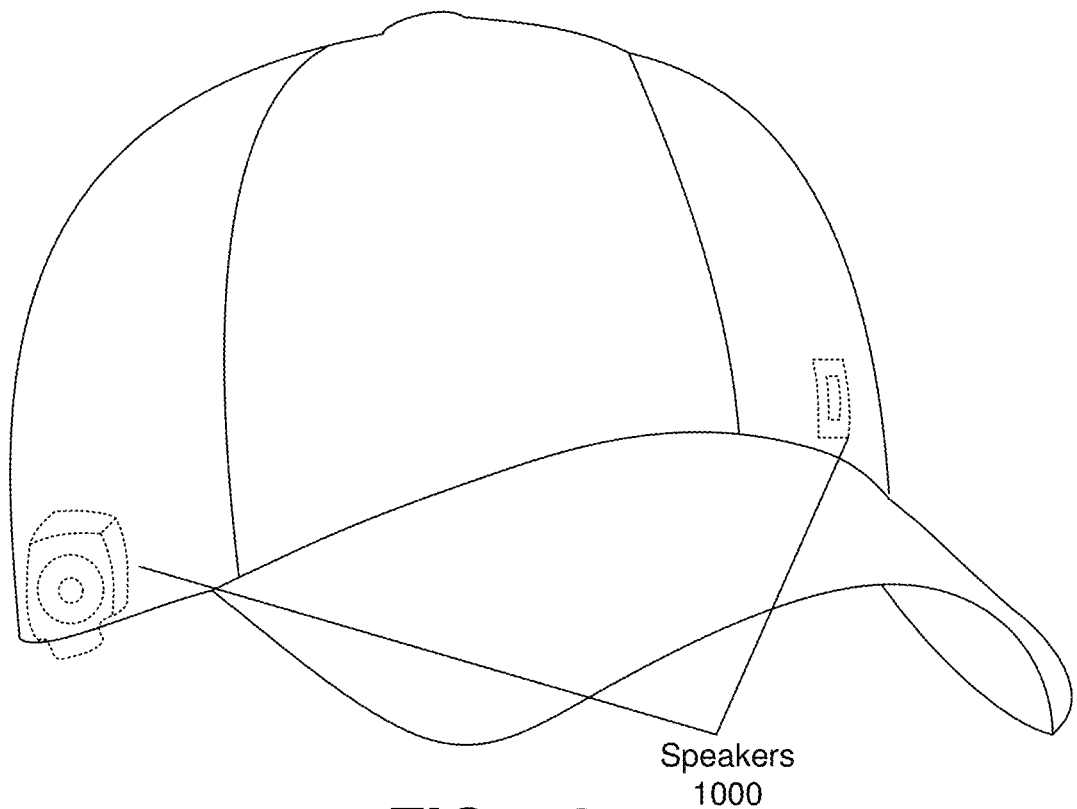
FIG. 10 is a front-left perspective view of a wearable augmented reality device showing the speaker positions, according to one embodiment.

FIG. 10 illustrates an embodiment in which speakers 1000 are mounted on the inside of the crown. The speakers 1000 are positioned to be directly over the ears of the wearer. The speakers may be mounted to the headband rather than the crown.

The fabric of the AR hat can be replaceable to allow various shapes and colors. For example, Pokémon Go® players could have an Ash Ketchum® style hat, while Disneyland® parks could rent hats with mouse ears, etc. The outer side of the crown may be used to overlay a unique pattern (e.g., a QR code) for: (a) identification of a player in a multiplayer game by cameras mounted on other players' systems; or (b) 6DOF location calculation by an outside-in tracking system. These different visual representations maintain substantially the same electronics/mechanical structure but change the visual appearance of the hat.

Figure 11:
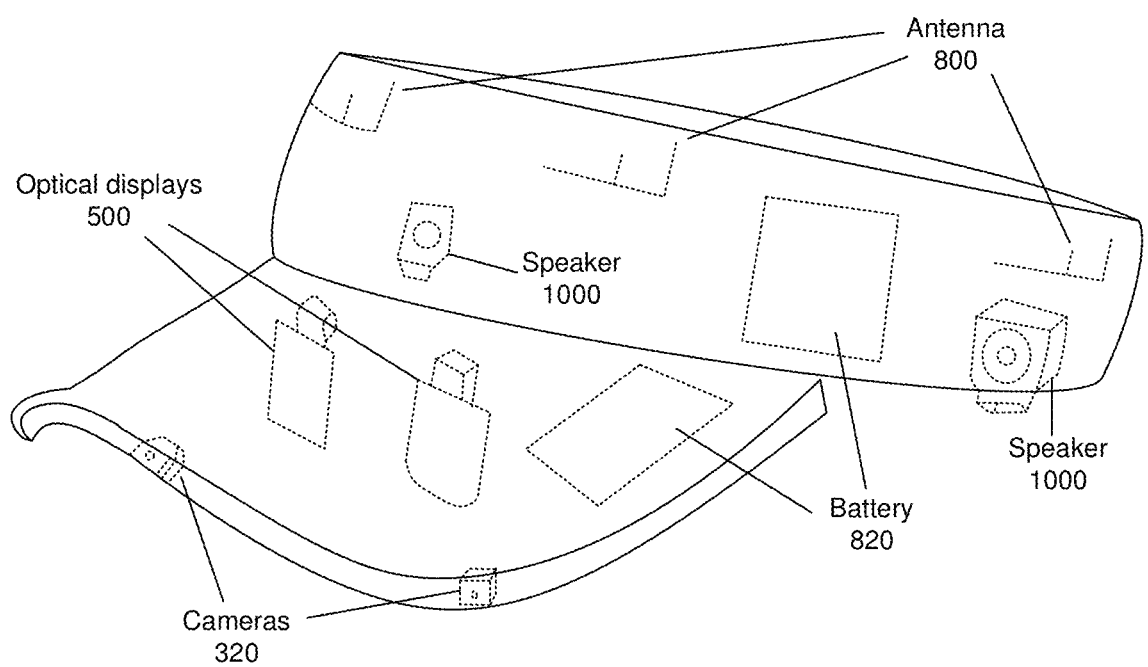
FIG. 11 is a front-right perspective view of a wearable augmented reality device in the form of a visor rather than a hat, according to one embodiment.

FIG. 11 illustrates an alternative embodiment of the AR hat in which the components are arranged to fit a visor form factor. In the embodiment shown, the components in the crown have been placed around the headband. Thus, the crown fabric can be omitted to make a visor shaped device. Additionally or alternatively, the visor profile may include attachment portions (e.g., Velcro® tabs) configured to enable different designs and colors of crown to be attached and removed as desired.

Figure 12:
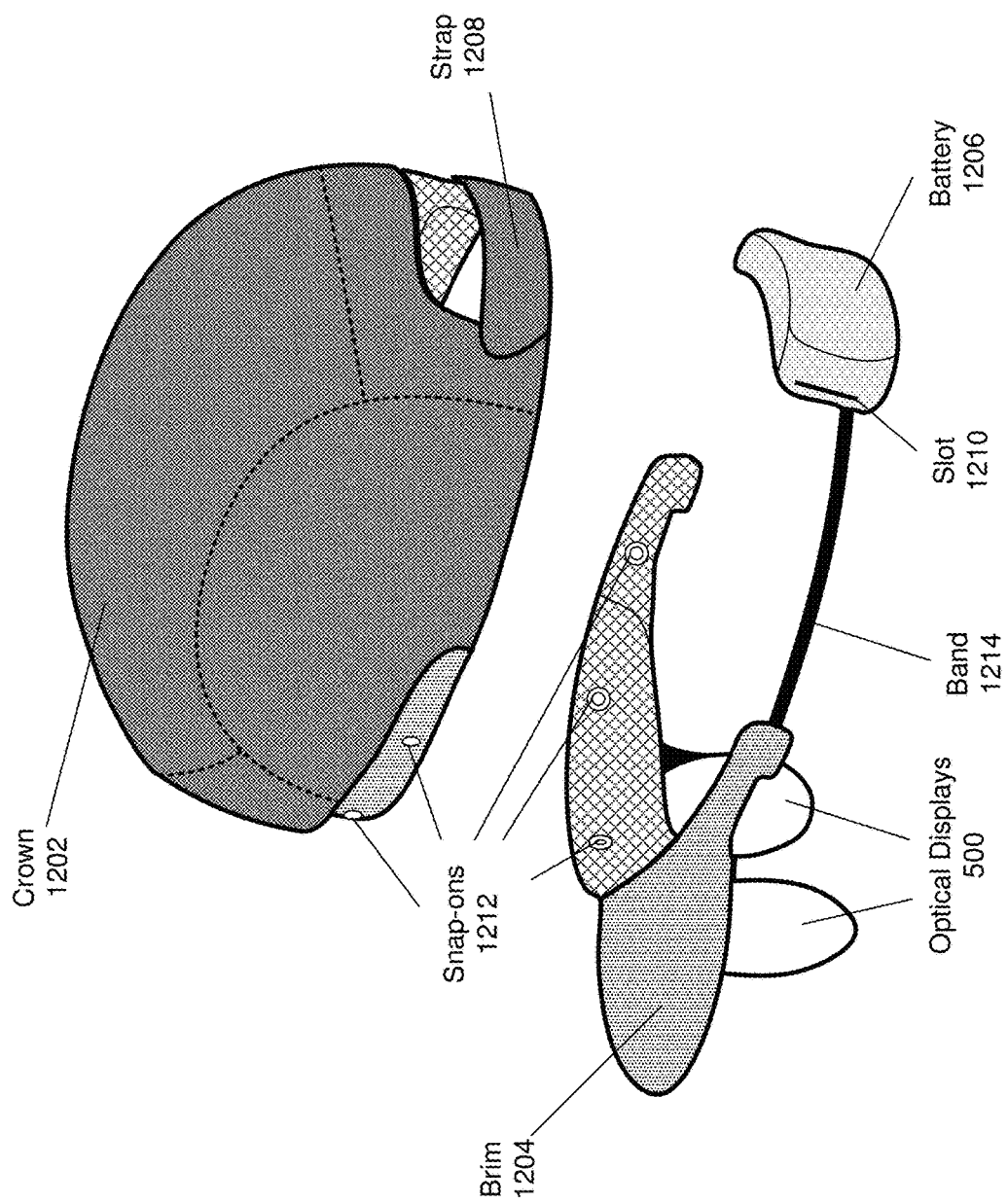
FIG. 12 is a back-right perspective view of a wearable augmented reality device with a detachable crown, according to one embodiment.

FIG. 12 is a back-right perspective view of a wearable augmented reality device with a detachable crown, according to one embodiment. In the embodiment shown, the crown 1202 portion of the AR hat is removable and interchangeable such that a user can choose different colors or designs for the crown 1202. In this embodiment the components are arranged to fit a visor form factor. The visor may have a partially rigid band 1214 configured to support the components of the AR device (e.g., the optical displays, battery, speakers, etc.). In some embodiments the partially rigid band does not wrap completely around the user's head and can flex to accommodate varying head sizes. For example, the band may wrap around the user's forehead, over their left ear, and around the back of their head, but not cover the area over the user's right ear. In other embodiments the band may form a complete loop around the user's head and be adjustable.

The partially rigid band 1214 may be coupled to a fabric cover (e.g., fabric cover 1302). The fabric cover may be interchangeable with other fabric covers for customization. The fabric cover may be removed from the band 1214 for washing. The fabric cover may couple to the band 1214 by threading the band 1214 through a pocket of the fabric cover. The fabric cover may be used when the AR device is configured to be a visor or hat. A mean of adjustability such as a dial or Velcro® strap may be included with the fabric cover to provide a customized fit for the user.

The components of the AR device are placed in the brim 1204 portion of the visor as well as around the partially rigid band 1214. Weight of the components may be balanced across the visor for user comfort and device stability. For example, components controlling the optical displays 500 and audio may be situated in the brim 1204 portion while the battery 1206 is situated as the back of the visor band 1214 for approximately even weight distribution.

To couple the removable crown 1202 portion to the visor portion, the user aligns a series of snap-on attachments 1212 of the visor and the crown 1202. The visor may have the female half of the snap-on attachments 1212 while the crown has the male half of the snap-on attachments 1212. In other embodiments the configuration of the male and female snap-ons 1212 may be switched or mixed such that male and female halves of the snap-on attachments 1212 are on both the visor and crown 1202. The snap-on attachments 1212 are located on the interior of the visor band 1214 such that they are not visible from the outside. The crown 1202 snap-ons 1212 are on the exterior surface of the crown in a recessed area such that they may fit into the snap-ons of the visor band seamlessly. When the crown 1202 is attached to the visor the snap-on attachments 1212 are not visible. Alternatively, some or all of the snap-ons 1212 may be positioned to be visible and contribute to the aesthetic design of the hat. The visor may additionally have a slot 1210 through which a strap 1208 of the crown can be threaded to further anchor the crown to the visor. The strap 1208 of the crown may act as a VELCRO or other attachment for the user to adjust the size of the AR hat for their comfort. The strap 1208, slot 1210, and battery 1206 may be referred to as the adjustment region, and the adjustment region may allow for customization of the size (e.g., the length or diameter) of the band 1214. The adjustment region may also house the battery.

Figure 13:
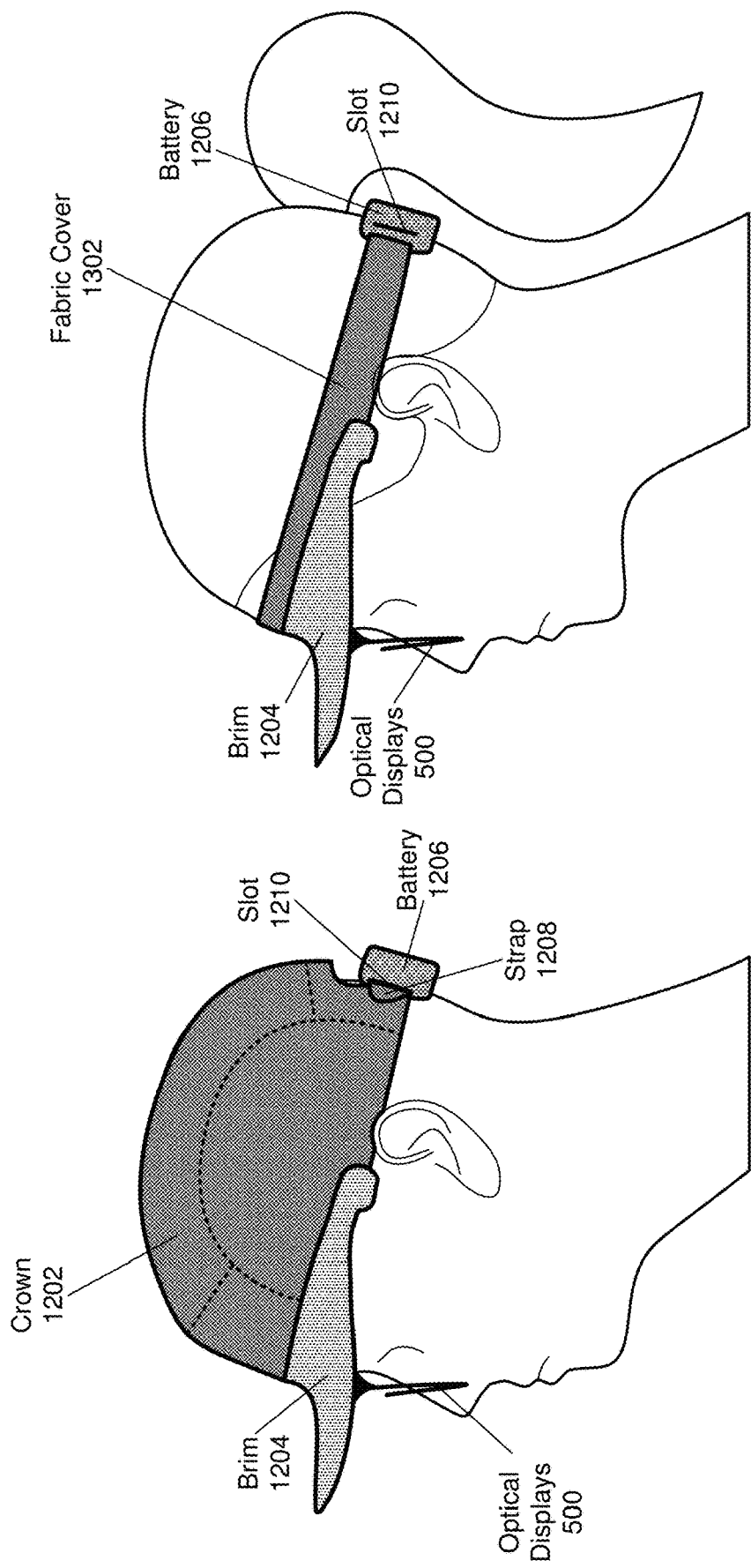
FIG. 13 is a right side view of a wearable augmented reality device with a detachable crown showing two configurations.

FIG. 13 is a right side view of a wearable augmented reality device with a detachable crown showing two configurations. The left side of the figure depicts a user wearing the augmented reality device as a hat with the crown 1202 attached while the right side of the figure shows a user wearing the augmented reality device as a visor with the crown 1202 detached. The visor embodiment include the fabric cover 1302 through which the partially rigid band 1214 is threaded. In the hat configuration the crown 1202 is secured to the visor with the snap-on attachments 1212 shown in FIG. 12 (not visible here). The crown 1202 is further secured with a strap 1208 that is threaded through a slot 1210 in the battery 1206.

The crown portion of the wearable augmented reality device may have an identifier such as a QR code or another visual encoder. The identifier may be used to identify devices in the same environment. For example, another wearable AR device or client device may capture an image of the identifier and process the image to create an identity for the user wearing the device in the image. In this way devices interact in multiplayer game settings by identifying other players of the game nearby and establishing contact with them. The connection between devices may further be established through message streams or sharing location between devices.

Example Computing Device Architecture

Figure 14:
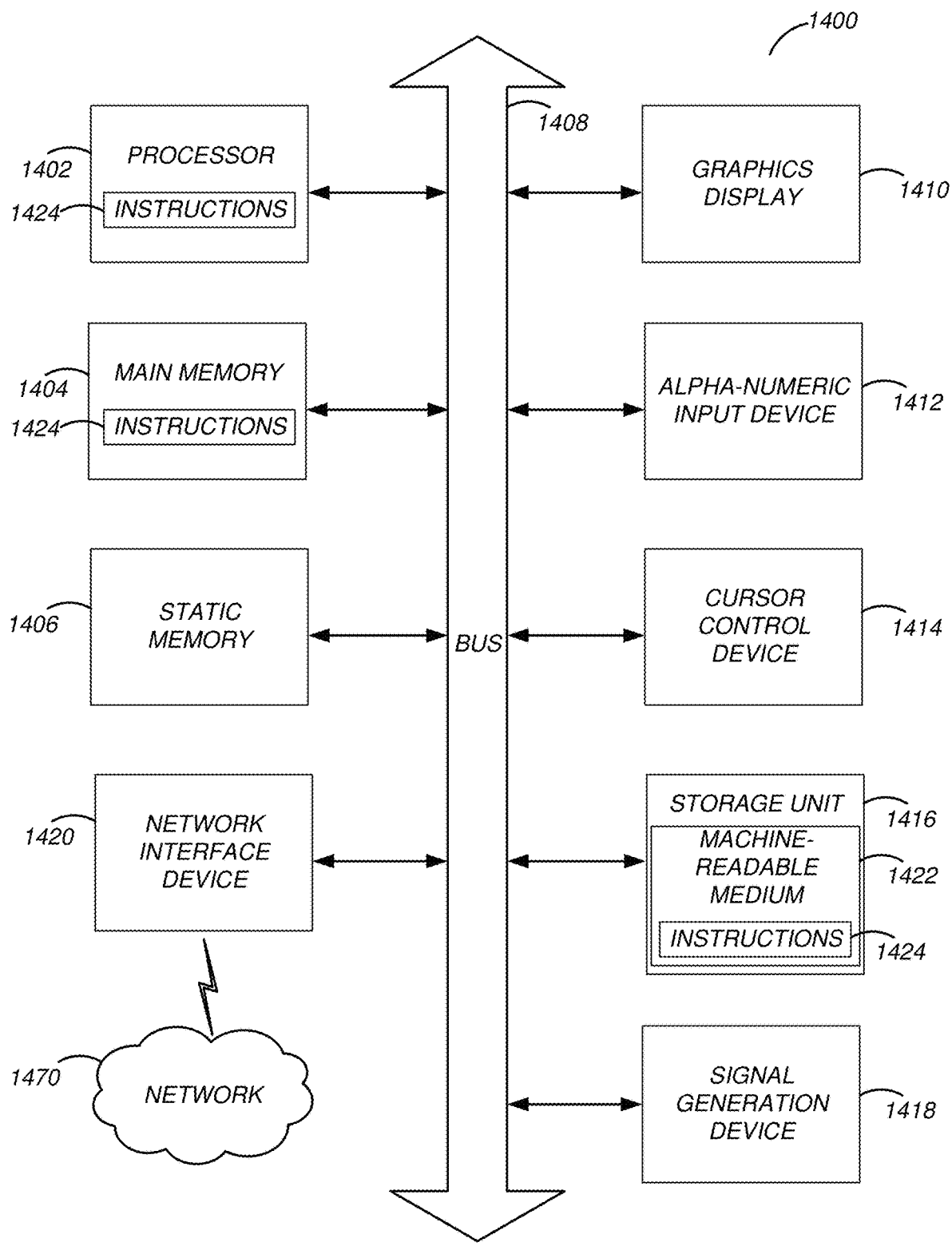
FIG. 14 is a block diagram illustrating an example computer suitable for use in a computer-based system.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400. The computer system 1400 can be used to execute instructions 1424 (e.g., program code or software) for causing the machine to perform any one or more of the methodologies (or processes) described herein, including those associated, and described, with the components (or modules) of a game server 110 or client 140.

The machine may be a server computer, a client computer, a personal computer (PC), a tablet PC, a set-top box (STB), a smartphone, a network router, switch or bridge, a cell phone tower, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally one or more processors 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 1402 may refer to a single processor or multiple processors. The computer system 1400 also includes a main memory 1404. The computer system may include a storage unit 1416. The processor 1402, memory 1404, and the storage unit 1416 communicate via a bus 1408.

In addition, the computer system 1400 can include a static memory 1406, a display driver 1410 (e.g., to drive a plasma display panel (PDP), a liquid crystal display (LCD), or a projector). The computer system 1400 may also include alphanumeric input device 1414 (e.g., a keyboard), a cursor control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1470 (e.g., network 105) via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store the instructions 1424. The term "machine-readable medium" shall also be taken to include any medium that is capable of storing instructions 1424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

What is claimed is:

1. A wearable augmented reality device comprising:
    a headband configured to wrap at least partially around a head of a user and distribute weight of components of the device across the head of the user;
    a brim coupled to the headband and extending away from the headband, the brim including a heatsink configured to release heat from electronics of the device into an environment of the device, wherein the heatsink comprises a plurality of heat conducting fins positioned on a top surface of the brim, and the plurality of heat conducting fins add surface area to the brim to increase a contacting area between the brim and the environment to increase heat dispassion;
    an optical displays coupled an underside of the brim, the optical displays configured to emit image light and to allow light from the environment to pass through the optical displays; and
    an environmental sensor coupled to a forward edge of the brim, the environmental sensor configured to capture data about the environment of the device.

2. The wearable augmented reality device of claim 1, further comprising a fabric crown configured to attach to the headband.

3. The wearable augmented reality device of claim 2, wherein the fabric crown couples to the headband via a fabric cover that includes a pocket through which the headband is threaded.

4. The wearable augmented reality device of claim 2, wherein the fabric crown couples to the headband via a plurality of snaps in corresponding locations on the fabric crown and the headband.

5. The wearable augmented reality device of claim 2, wherein the crown includes a visual identifier configured to be detected by a camera of another device to identify the wearable augmented reality device.

6. The wearable augmented reality device of claim 5, wherein the visual identifier is a QR code.

7. The wearable augmented reality device of claim 1, wherein the optical display is coupled to a rigid brim with a hinge, the hinge configured to allow the optical display to be in a folded position against the underside of the rigid brim or an unfolded position in which the optical display is substantially perpendicular to a bottom surface of the brim.

8. The wearable augmented reality device of claim 1, wherein the environmental sensor comprises a camera configured to capture images of the environment of the device.

9. The wearable augmented reality device of claim 8, wherein the camera is one of a plurality of cameras configured to capture images of the environment from different perspectives.

10. The wearable augmented reality device of claim 1, wherein the environmental sensor comprises a depth sensor configured to capture depth data of the environment of the device.

11. The wearable augmented reality device of claim 1, wherein the heatsink of the brim further comprises an active heatsink comprising a fan and a heat exchanger.

12. The wearable augmented reality device of claim 1, further comprising an adjustment region configured to adjust a size of the headband.

13. The wearable augmented reality device of claim 12, wherein the adjustment region comprises a dial configured to adjust the size of the headband when turned.

14. The wearable augmented reality device of claim 13, wherein the adjustment region is further configured to house a battery.

15. The wearable augmented reality device of claim 12, wherein the adjustment region comprises a slot through which a strap of a crown or the headband is threaded.

16. The wearable augmented reality device of claim 1, further comprising a speaker coupled to the headband.

17. The wearable augmented reality device of claim 1, further comprising a socket configured to connect the wearable augmented reality device to an auxiliary device.

18. The wearable augmented reality device of claim 17, wherein the auxiliary device is a smartphone configured to control the optical display.

19. The wearable augmented reality device of claim 17, wherein the auxiliary device is an external battery.

* * * * *